(12) United States Patent
Rodrigue et al.

(10) Patent No.: US 12,404,022 B2
(45) Date of Patent: Sep. 2, 2025

(54) RETRACTABLE CARGO HOOK

(71) Applicant: Bell Textron Inc., Fort Worth, TX (US)

(72) Inventors: Simon Rodrigue, Laval (CA); Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 72 days.

(21) Appl. No.: 17/368,218

(22) Filed: Jul. 6, 2021

(65) Prior Publication Data

US 2023/0009616 A1    Jan. 12, 2023

(51) Int. Cl.
*B64D 1/12* (2006.01)
*B64D 1/10* (2006.01)
*B64D 1/14* (2006.01)

(52) U.S. Cl.
CPC ............... *B64D 1/12* (2013.01); *B64D 1/10* (2013.01); *B64D 1/14* (2013.01); *B64D 2201/00* (2013.01)

(58) Field of Classification Search
CPC ... B64D 1/02; B64D 1/12; B64D 1/22; B64D 17/383; B64C 29/0091; B64U 2101/64; B64U 2101/67
See application file for complete search history.

(56) References Cited

U.S. PATENT DOCUMENTS

| | | | | |
|---|---|---|---|---|
| 3,158,357 A * | 11/1964 | Campbell | ............... | B64D 1/22 258/1.2 |
| 3,630,562 A * | 12/1971 | Metz | .................. | B66C 1/34 294/82.33 |
| 3,656,796 A * | 4/1972 | Cook | .................. | B66C 1/16 294/81.1 |
| 5,499,785 A * | 3/1996 | Roberts | ............ | B64D 1/12 244/3 |
| 5,850,991 A * | 12/1998 | Hainsworth | ............ | B64D 1/22 244/137.4 |
| 8,172,184 B2 * | 5/2012 | Spencer | ............... | B66C 1/36 294/82.11 |
| 10,532,914 B2 * | 1/2020 | Autissier | ............... | B64D 1/22 |
| 2012/0193476 A1 * | 8/2012 | Figoureux | ............... | B64D 1/22 244/137.4 |
| 2014/0252169 A1 * | 9/2014 | Prud'Homme-Lacroix | | B64D 9/00 29/525.01 |
| 2019/0233254 A1 * | 8/2019 | Shin | .................. | B64U 70/30 |
| 2022/0033079 A1 * | 2/2022 | Felder | ............... | B64U 50/19 |

OTHER PUBLICATIONS

"Math Glossary: Mathematics Terms and Definitions." ThoughtCo, Jan. 15, 2020, www.thoughtco.com/glossary-of-mathematics-definitions-4070804. (Year: 2020).*
"Perpendicular." Merriam-Webster Dictionary, www.merriam-webster.com/dictionary/perpendicular archived on Sep. 9, 2015 at Internet Archived, https://web.archive.org/web/20150912014352/http://www.merriam-webster.com/dictionary/perpendicular (Year: 2015).*

* cited by examiner

*Primary Examiner* — Philip J Bonzell
(74) *Attorney, Agent, or Firm* — Frost Brown Todd LLP

(57) ABSTRACT

A retractable cargo hook for aircraft is described. The cargo hook including a torsion spring allowing rotatable attachment to an aircraft body. An optional recessed portion of the aircraft body can house and receive the cargo hook. This can protect interior components from crashes which can push the cargo hook into the aircraft fuselage, damaging components.

8 Claims, 5 Drawing Sheets

RETRACTABLE CARGO HOOK

TECHNICAL FIELD

The present disclosure is directed to cargo hooks for aircraft.

BACKGROUND OF THE INVENTION

It is common for helicopters and other aircraft to be used to deliver cargo. Sometimes this cargo is carried outside of the fuselage and is carried via retractable cargo hooks. Cargo hooks, by being intrusive components, must be taken into account when designing safety systems for aircraft.

BRIEF SUMMARY OF THE INVENTION

One embodiment under the present disclosure is a cargo hook for an aircraft, comprising: an arm portion comprising a torsion spring configured to rotatably couple the cargo hook about an axis; a retractable hook; and a hook body coupled to the arm portion and to the retractable hook and comprising machinery for retracting and extending the retractable hook.

Another embodiment is a helicopter with a cargo hook, comprising: a fuselage; a main rotor; a tail rotor; a recessed portion disposed on an underside of the fuselage; a cargo hook coupled to the fuselage within the recessed portion, the cargo hook comprising; an arm portion comprising a torsion spring configured to rotatably couple the cargo hook about an axis; a retractable hook; and a hook body coupled to the arm portion and to the retractable hook and comprising machinery for retracting and extending the retractable hook.

Another embodiment is a method constructing a helicopter, comprising: providing a fuselage comprising a main rotor and a tail rotor; providing a torsion spring that is rotatable about an axis; and rotatably coupling a cargo hook to an underside of the fuselage with the torsion spring, the torsion spring configured to bias the cargo hook to one side of the axis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
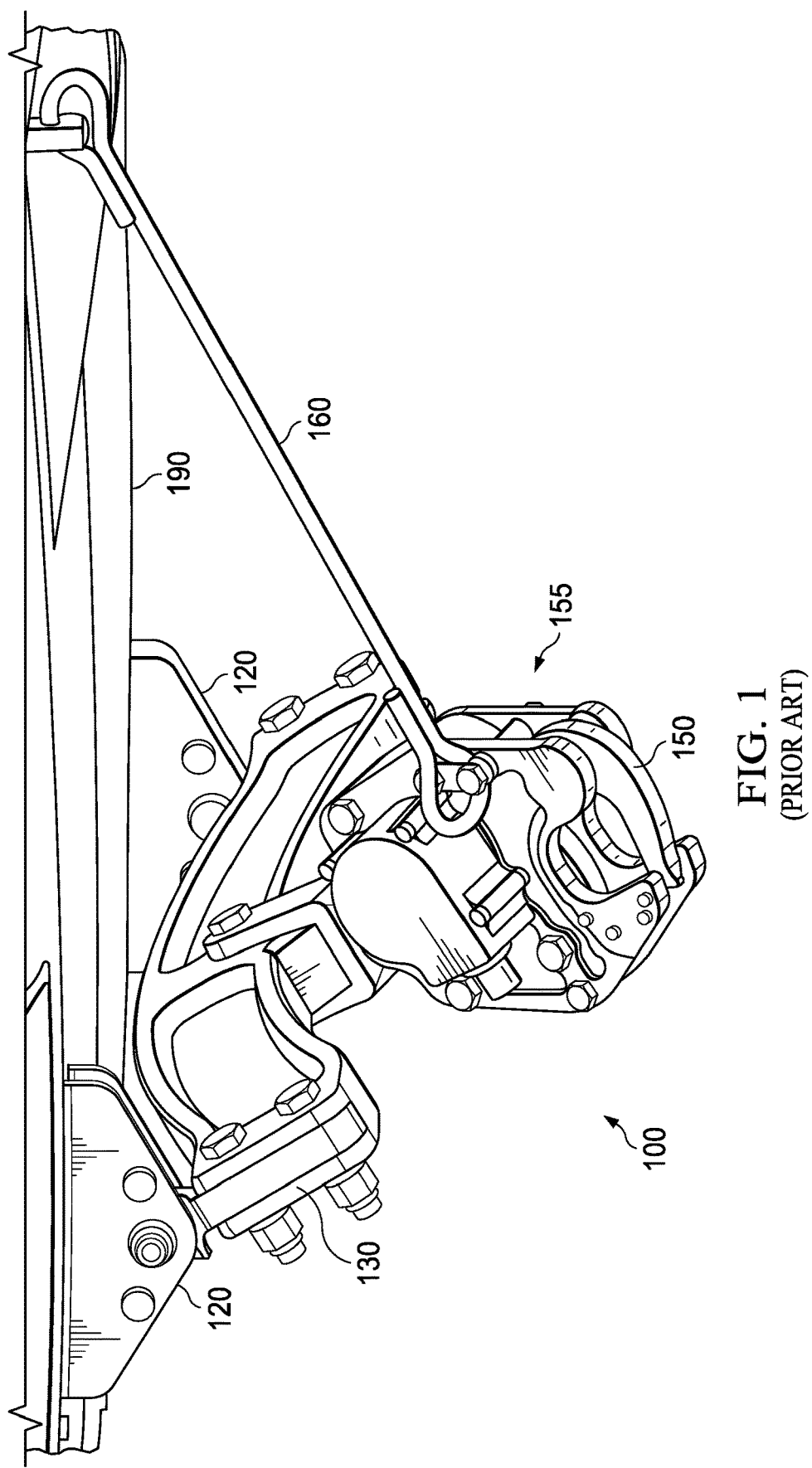
FIG. 1 is a diagram of a prior art embodiment.

Referring now to FIG. 1, a prior art cargo hook 100 can be seen. Cargo hook 100 comprises an arm portion 130 and a retractable hook apparatus 155 with a hook 150. Retractable hook apparatus 155 is connected by bungee cable 160 to aircraft body 190. Arm portion 130 is rotatably connected to aircraft body 190 via attachments 120. Teachings under the present disclosure include cargo hooks that are cheaper with easier maintenance, do not require additional backup structure to hold the lanyard/bungee cable, less risk of damaging the lanyard when aircraft lands on harsh terrain or if inadvertently hooked up, smaller footprint, safer crash dynamics, and/or fewer components than some prior art systems. Additionally, embodiments under the present disclosure can include cargo hooks with preferred orientation when no load is applied. Thus, during emergency situations, the mass on hook can be ejected, then hook would return in preferred orientation and if crash occurs, damage would be controlled, minimized, or directed in a less harmful direction.

Figure 2:
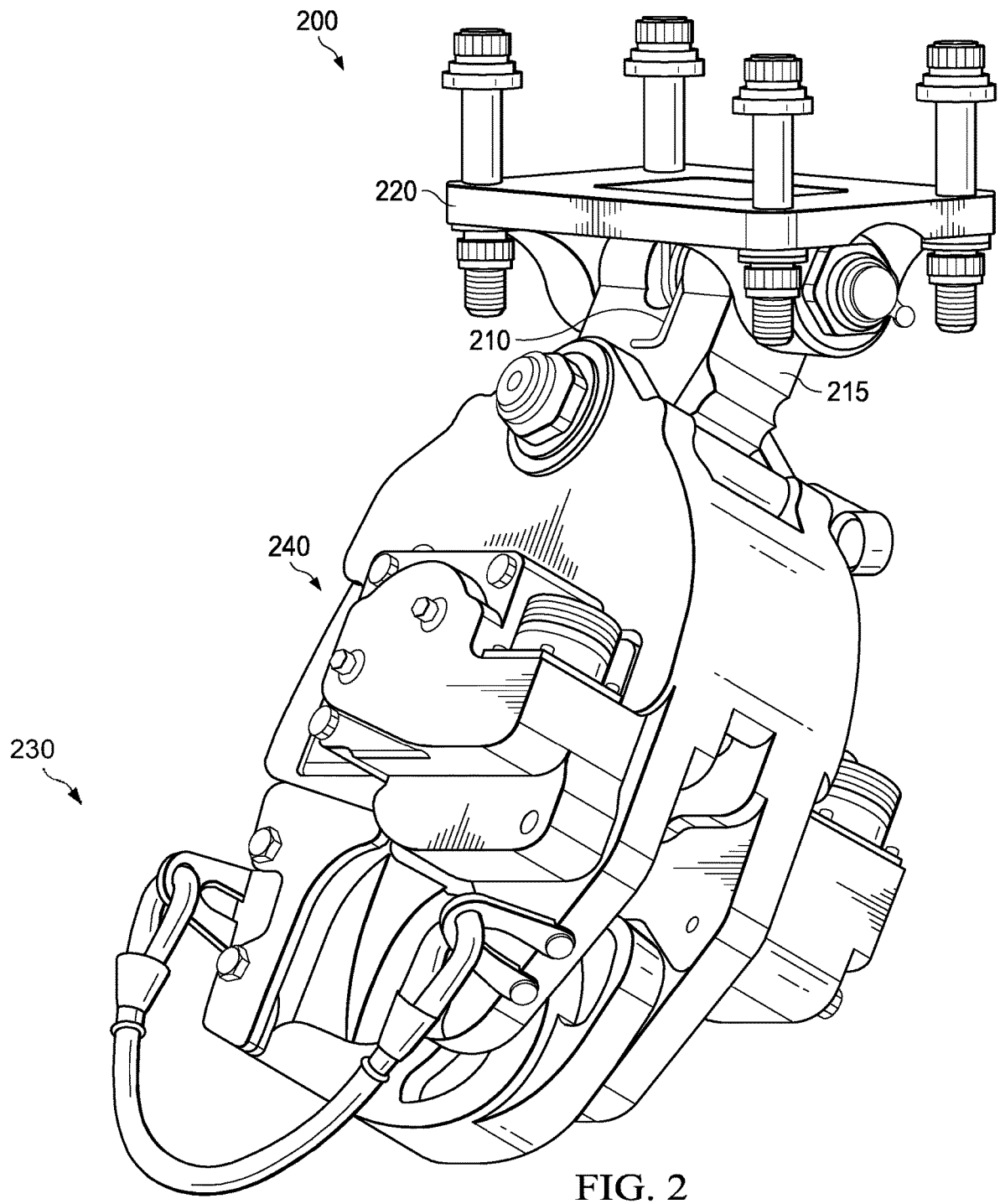
FIG. 2 is a diagram of a cargo hook embodiment.

An embodiment of a cargo hook under the present disclosure can be seen in FIG. 2. Cargo hook 200 comprises an arm portion 215 that is rotatably coupled to attachment plate 220. Attachment plate 220 can be coupled to an aircraft body, such as a helicopter, with bolts or other appropriate attachment means. A torsion spring 210 is coupled to the rotatable coupling of the arm portion 215 and the attachment plate 220. The torsion spring 210 works to keep the cargo hook 200 biased to one side and sitting closer to an aircraft body, rather than hanging straight down when no load is applied. Hook body 240 is coupled to the arm portion 215 and has a hook 230 that can be used to attach to cargo loads. Gearing and machinery within the hook body are operable to release the hook 230. Gearing and machinery can be configured to be operable by a pilot or other user.

Figure 3:
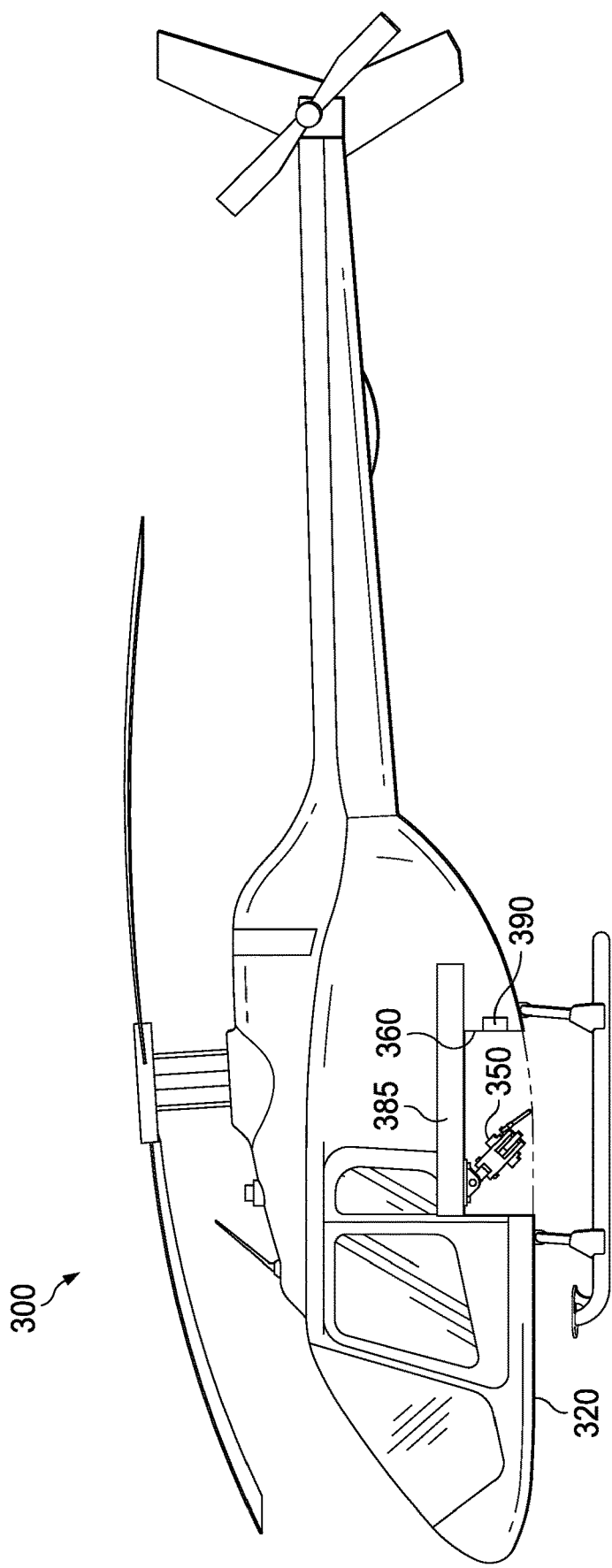
FIG. 3 is a diagram of a helicopter embodiment.

FIG. 3 shows a possible helicopter embodiment under the present disclosure. Helicopter 300 comprises a cargo hook 350, such as described in FIG. 2. Cargo hook 350 can be disposed in a recess 360 that may or may not be viewable from a side view. Recess 360 can provide a place for cargo hook 350 to retract into. In case of a crash, the cargo hook 350 might be pushed into recess 360 instead of directly into fuselage 320 of helicopter 300. This can help protect a component(s) 385 within fuselage 320. Component 385 can be passenger seating, fuel storage or lines, energy/battery packs, or other components. An airbag 390 (or other safety mechanism) can be deployed during a crash to provide further protection.

While FIG. 3 shows a recess 360, other embodiments can comprise a cargo hook attached to an underside of helicopter 300 with no recess 360. Even without a recess, damage to the helicopter 300 can be minimized, such as by biasing the cargo hook with an orientation toward less dangerous components.

Coupling the cargo hook 350 and torsion spring 210 into a recess or onto a helicopter can take a variety of forms. An attachment plate can be used, which is bolted to the helicopter and also couples to the torsion spring. An attachment plate or other attachment means can also be riveted to a part of the fuselage.

A helicopter, or other aircraft, such as described in FIG. 3 can comprise multiple cargo hooks. They can be disposed fore and aft of each other, or in a similar position along the aircraft body. They can be disposed such that multiple cargo hooks are in a single recessed portion. Or an aircraft can comprise multiple separate recessed portions each with a cargo hook. If there are multiple cargo hooks, some can be pointed fore of the aircraft by their torsion spring, and some can be pointed aft. On some aircraft, a recessed portion may not be available due to size or other constraints. In such embodiments, a cargo hook as described herein can be used without a recessed portion. In some embodiments, a single recessed portion can comprise two (or more) cargo hooks at different locations of the recess and are biased, or "pointing," toward each other. Some embodiments can utilize cargo hooks that move on a left/right axis about a torsion spring, instead of fore/aft. A left/right recess can be used to house such embodiments. A single aircraft can comprise both fore/aft and left/right cargo hooks and recesses.

Benefits of the teachings of the present disclosure include greater safety, both by protecting passengers but in also minimizing the chances of fuel or battery packs being crushed or impacted by a crash. Torsion springs also allow the recessed portions of aircraft to be minimized by making cargo hooks have a smaller footprint and by avoiding bungee cables and cable equipment. Fuselages may need less reinforcement around susceptible components, resulting in weight savings. Systems susceptible to being punctured or damaged by hook throughout crash sequence (such as airbags) can have a more targeted placement. For example, airbags can have a more targeted placement because the cargo hooks are prejudiced to point a certain direction.

Figure 4:
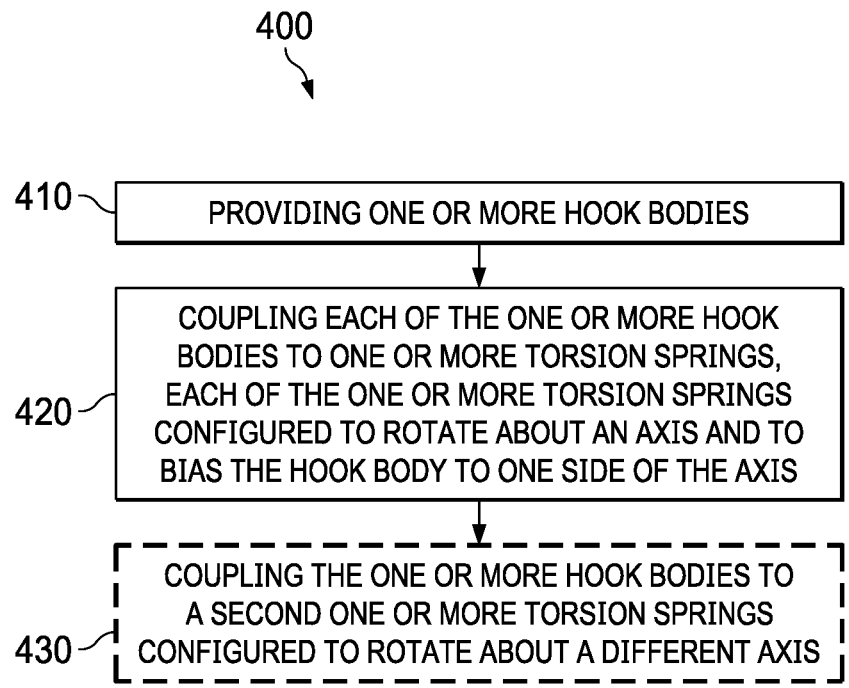
FIG. 4 is a diagram of a method embodiment.

One method embodiment under the present disclosure is a method of constructing a cargo hook, such as shown in FIG. 4. In method 400, step 410 is providing one or more hook bodies. Step 420 is coupling each of the one or more hook bodies to one or more torsion springs, each of the one or more torsion springs configured to rotate about an axis and to bias the hook body to one side of the axis. Optional step 430 can comprise coupling the one or more hook bodies to a second one or more torsion springs configured to rotate about a different axis.

Figure 5:
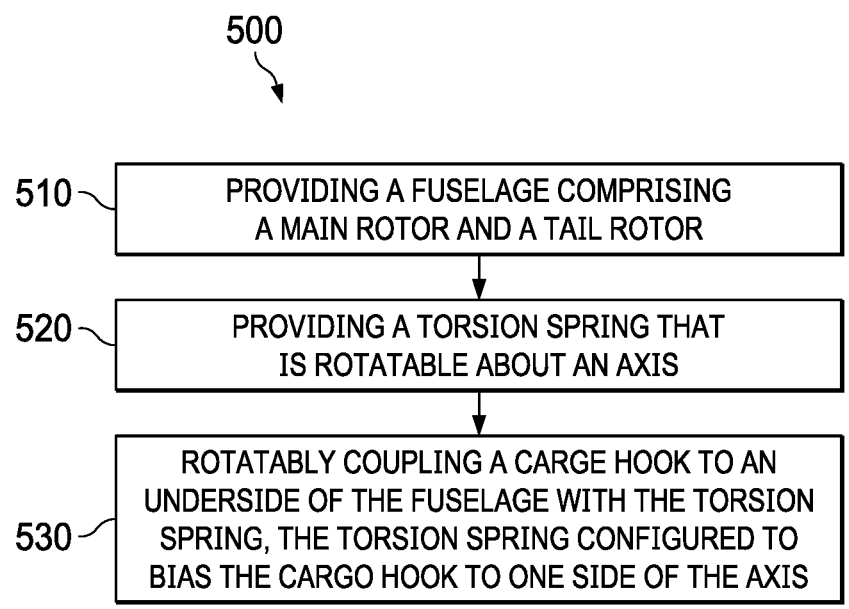
FIG. 5 is a diagram of a method embodiment.

Another possible method under the present disclosure is a method of constructing an aircraft. In method 500, shown in FIG. 5, step 510 is providing a fuselage comprising a main rotor and a tail rotor. Step 520 is providing one or more torsion springs that are each rotatable about an axis. Step 530 is rotatably coupling one or more cargo hooks to an underside of the fuselage with the one or more torsion springs, the one or more torsion springs configured to bias its respective cargo hook to one side of the axis.

The cargo hook, torsion spring, and other components can comprise a variety of materials. The hook body and torsion spring preferably comprise metals, such as stainless steel. However, other embodiments are possible utilizing various alloys, aluminum, corrosion resistant stainless steel, composites, and other materials.

Figure 6:
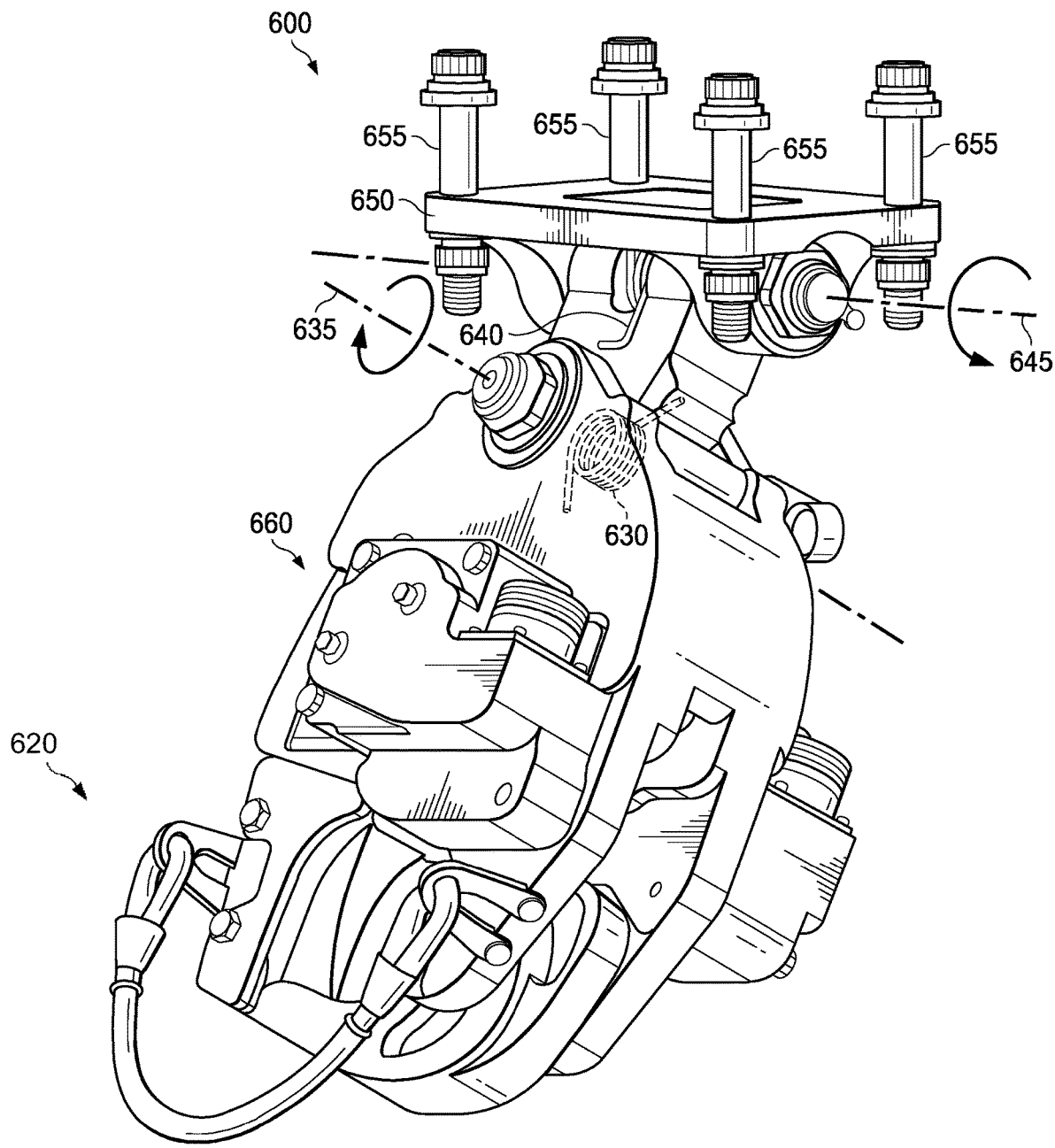
FIG. 6 is a diagram of a cargo hook embodiment.

Another embodiment under the present disclosure can comprise a cargo hook that can pivot along multiple axes. For example, a coupling between a cargo hook and an aircraft can comprise two torsion springs, such that the cargo hook can move fore/aft and left/right. Such an embodiment can be seen in FIG. 6. Cargo hook 600 comprises an attachment plate 650, bolts 655, hook body 660, and detachable hook 620. Hook body 660 can comprise internal components to allow for the detaching of detachable hook 620 upon a command from a pilot or other user. Part of these components can include processors, switches, or controllers that are communicatively coupled to a control system. Torsion spring 640 is similar to torsion springs described above. Torsion spring 640 can rotate about axis 645. An additional torsion spring 630 can be placed in the interior of hook body 660 that rotates about axis 635. A cargo hook embodiment such as in FIG. 6 can give greater control over location of cargo hook 600, such as during a crash or other event. For example, in the embodiment shown, the biased orientation of the cargo hook 600 may be to the left of axis 645, and to the right of axis 635. The rest position of cargo hook 600 can resemble an 'L'. In helicopter embodiments with cargo hooks with multiple axes of rotation, a recessed portion may also take 'L' or other angled shapes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cargo hook for an aircraft, comprising:
   an arm portion configured to be operatively coupled to the aircraft and comprising a first torsion spring, the first torsion spring configured to allow the arm portion to rotate about a first axis;
   a load hook configured to be coupled to a cargo load that is outside of the aircraft;
   a hook body coupled to the arm portion and to the load hook, wherein the hook body is coupled to the arm portion by a second torsion spring configured to allow the hook body to rotate about a second axis, wherein the arm portion defines a plane that includes the first axis, wherein the second axis is perpendicular to the plane, wherein the first torsion spring is configured to rotatably bias the hook body about the first axis and relative to a surface of the aircraft; and
   an attachment plate having a top-most surface which is configured to contact the surface of the aircraft, wherein the attachment plate is configured to support the entirety of the arm portion, wherein the attachment plate includes a first mount and a second mount,
   wherein the arm portion includes a first projection and a second projection, wherein the first and second projections are each positioned between the first mount and the second mount of the attachment plate, wherein the first torsion spring is positioned between the first mount and the second mount and between the first projection and the second projection.

2. The cargo hook of claim 1 wherein the arm portion comprises a metal.

3. The cargo hook of claim 1 wherein the first torsion spring is configured to bias the cargo hook in one direction toward the aircraft and away from vertical.

4. The cargo hook of claim 1 wherein the first and second torsion springs are configured to bias the cargo hook to a rest position with an L shape.

5. The cargo hook of claim 1 wherein the torsion spring comprises steel.

6. The cargo hook of claim 1, wherein the surface of the aircraft is downward facing.

7. The cargo hook of claim 1 wherein the attachment plate is rotatably coupled to the arm portion and the first torsion spring about the first axis and configured to be attached to the aircraft to thereby bias the hook body about the first axis and the aircraft.

8. The cargo hook of claim 7 wherein the attachment plate is configured to be bolted to the aircraft.

\* \* \* \* \*